United States Patent [19]
Huang

[11] Patent Number: 6,041,597
[45] Date of Patent: Mar. 28, 2000

[54] PNEUMATIC/HYDRAULIC BALANCE WEIGHT SYSTEM FOR MOTHER MACHINES

[76] Inventor: Chih-Hsiang Huang, P.O. Box 63-247, Taichung, Taiwan

[21] Appl. No.: 09/100,986

[22] Filed: Jun. 22, 1998

[51] Int. Cl.[7] .............................. F16D 31/02; F01B 21/04
[52] U.S. Cl. .................................. 60/415; 60/907; 60/716
[58] Field of Search .............................. 60/414, 415, 372, 60/711, 716, 907

[56] References Cited

U.S. PATENT DOCUMENTS

| | | | |
|---|---|---|---|
| 3,115,086 | 12/1963 | Stimmel | 60/372 X |
| 3,868,820 | 3/1975 | Lawson | 60/382 |
| 4,455,838 | 6/1984 | Junichi et al. | 60/907 X |
| 4,483,662 | 11/1984 | Stanton | 60/372 X |
| 4,807,518 | 2/1989 | Berchtold et al. | 91/421 |
| 5,303,549 | 4/1994 | Berchtold et al. | 60/414 |
| 5,425,237 | 6/1995 | Suer | 60/414 |

*Primary Examiner*—John E. Ryznic
*Attorney, Agent, or Firm*—Charles E. Baxley, Esq.

[57] ABSTRACT

A balance weight system for a unit includes a cylinder and a piston rod having a first end secured to the unit to move therewith. The piston rod further includes a second end with a piston head slidably received in the cylinder and separating the cylinder into a lower chamber for containing hydraulic oil and an upper chamber for containing air. A tank includes hydraulic oil contained in a lower part thereof and a working gas contained in an upper part thereof. A tube has a first end in the hydraulic oil in the lower part of the tank and a second end communicated with the lower chamber of the cylinder. The working gas exerts a pressure on the hydraulic oil to supply the piston rod with a force sufficient to uphold the unit. A motor is provided for moving the unit in a vertical direction.

11 Claims, 5 Drawing Sheets

PNEUMATIC/HYDRAULIC BALANCE WEIGHT SYSTEM FOR MOTHER MACHINES

BACKGROUND OF THE INVENTION

1. Field of the Invention

The present invention relates to a pneumatic/hydraulic balance weight system for mother machines, and more particularly to a pneumatic/hydraulic system for balancing a processing unit of a mother machine to thereby allow rapid, precise control of the processing unit.

2. Description of the Related Art

In industries, the processing units of many processing machines or mother machines are frequently moved, and it is difficult for the operator to rapidly, precisely control movements of the processing units that often weight more than one ton. FIG. 4 of the drawings illustrates a mother machine 40 in which the processing unit 44 thereof is balanced by a weight 41 (which generally has a weight approximately the same as that of the processing unit 44) via a chain 43 and gears 42. However, the weight 41 is bulky and thus causes other problems in manufacture and installation thereof. In addition, potential risk of injury to people exists as the supporting effect of the chain/gear system for supporting the heavy weight 41 and the processing unit 44 is doubtful.

FIG. 5 of the drawings illustrates an improved system that uses a hydraulically driven piston rod 551 to retain a processing unit 56 of a mother machine 50. The piston rod 551 includes an end slidably received in a cylinder 55 that is communicated to a tank 51 via a hydraulic/electromagnetic valve 54. For lifting the processing unit 56, a motor 52 drives a pump 53 to pump oil 511 in the tank 51 into a lower end of the cylinder 55 via line B, while gas in the upper end of the cylinder 55 flows to the valve 54 via line A. Lowering of the processing unit 56 is achieved by outputting gas from the valve 54 to the upper end of the cylinder 55 via line A, while hydraulic oil flows to the valve 54 via line B.

However, the tank 51 occupies a considerable space, and the hydraulic device often leaks and generates noise. In addition, control by the hydraulic device and the hydraulic/electromagnetic valve consumes considerable electricity, and the movement of the processing unit is very slow. Further, the control elements are numerous and thus are difficult to maintain.

The present invention is intended to provide a balance weight system to mitigate an/or obviate the above problems.

SUMMARY OF THE INVENTION

It is a primary object of the present invention to provide an improved balance weight system to uphold the heavy processing unit to allow easy vertical movement control of the processing unit.

The present invention provides a balance weight system for a unit comprising a cylinder. A piston rod has a first end secured to the unit to move therewith. The piston rod further includes a second end with a piston head slidably received in the cylinder and separating the cylinder into a lower chamber for containing hydraulic oil and an upper chamber for containing air. A tank includes hydraulic oil contained in a lower part thereof and a working gas contained in an upper part thereof. A tube has a first end in the hydraulic oil in the lower part of the tank and a second end communicated with the lower chamber of the cylinder. The working gas exerts a pressure on the hydraulic oil to supply the piston rod with a force sufficient to uphold the unit. Means is provided for moving the unit in a vertical direction.

The moving means includes a vertical screw rod which extends through the processing unit and a motor for driving the vertical screw rod. The motor may be a servomotor, and the working gas may be nitrogen.

A control switch device is mounted to the tube and includes a gas filler for filling the working gas into the tank. In a preferred embodiment of the invention, the working gas is nitrogen and is filled into the tank via the gas filler under a liquefied status. The control switch device may further include a pressure gauge to indicate the pressure of the working gas in the tank. The control switch system may also further include a release valve to release the working gas. In addition, a safety device including a safety valve and a needle valve may be provided for preventing downward movement of the processing unit without operation of the moving means.

In an embodiment of the invention, the upper chamber includes an outlet communicated with environment, and a muffler is mounted to the outlet to reduce noise.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
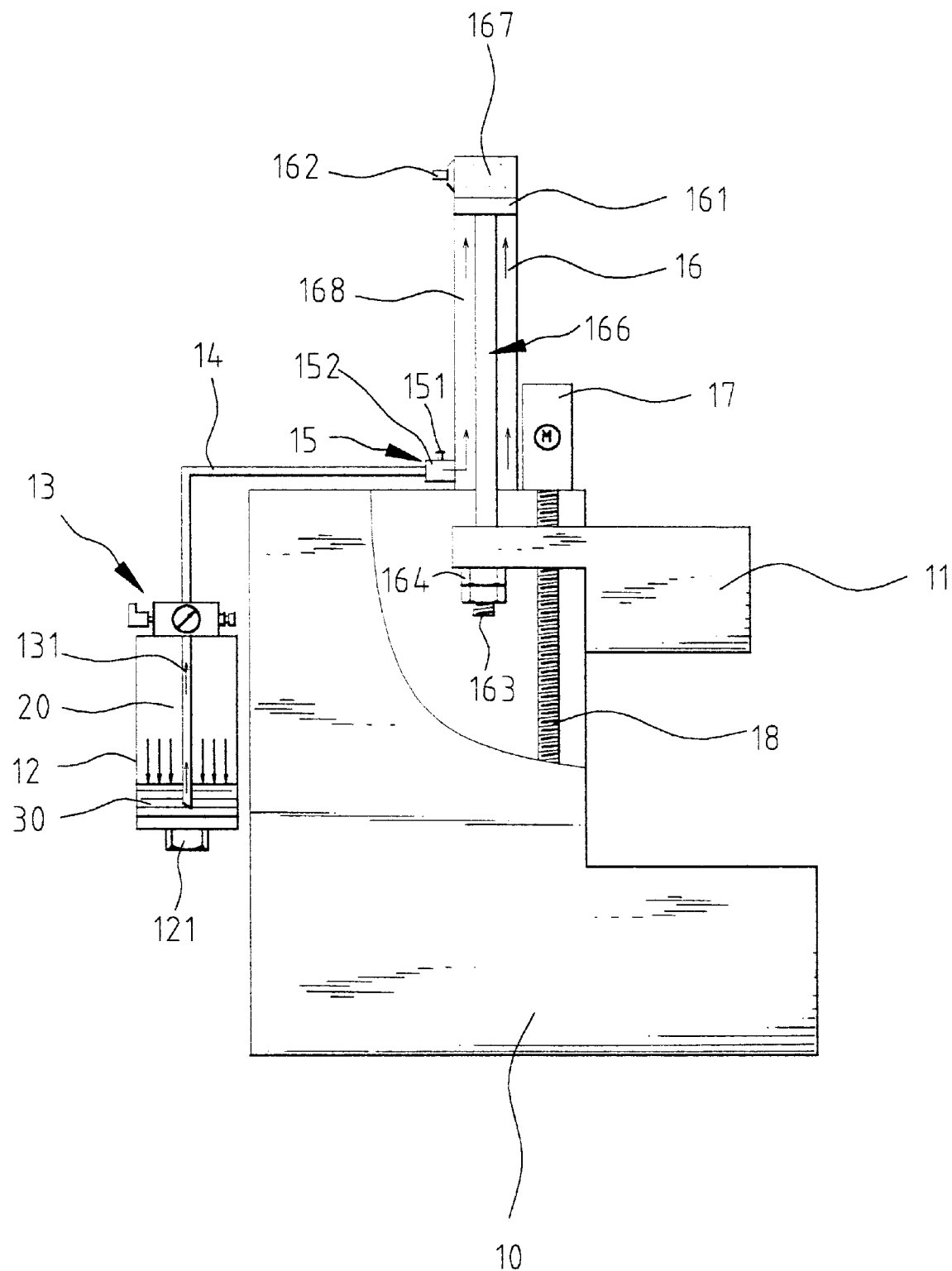
FIG. 1 is a side view, partly cutaway, of a mother machine equipped with a pneumatic/hydraulic balance weight system in accordance with the present invention.
Figure 2:
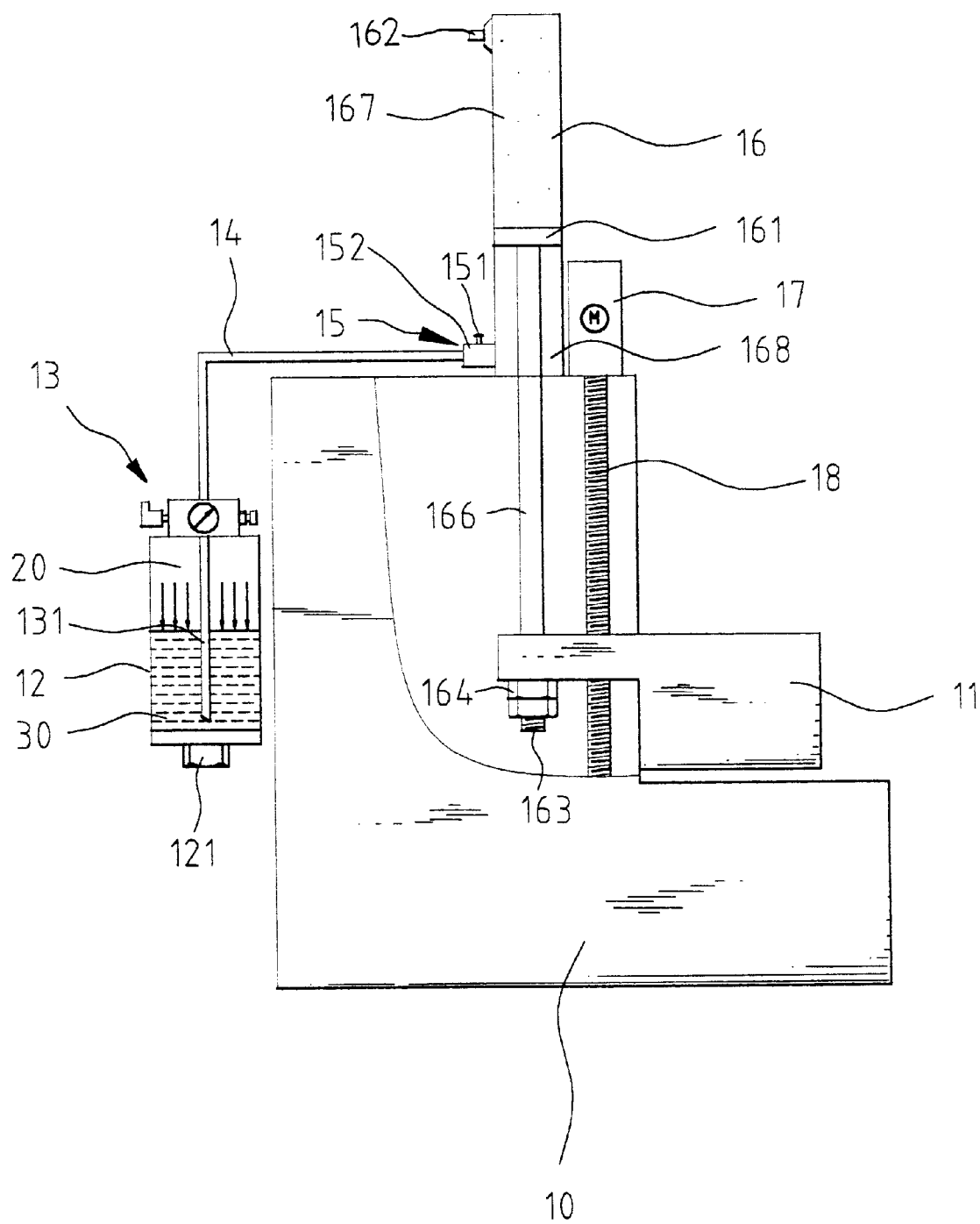
FIG. 2 is a side view similar to FIG. 1, illustrating operation of the pneumatic/hydraulic balance weight system in accordance with the present invention.
Figure 3:
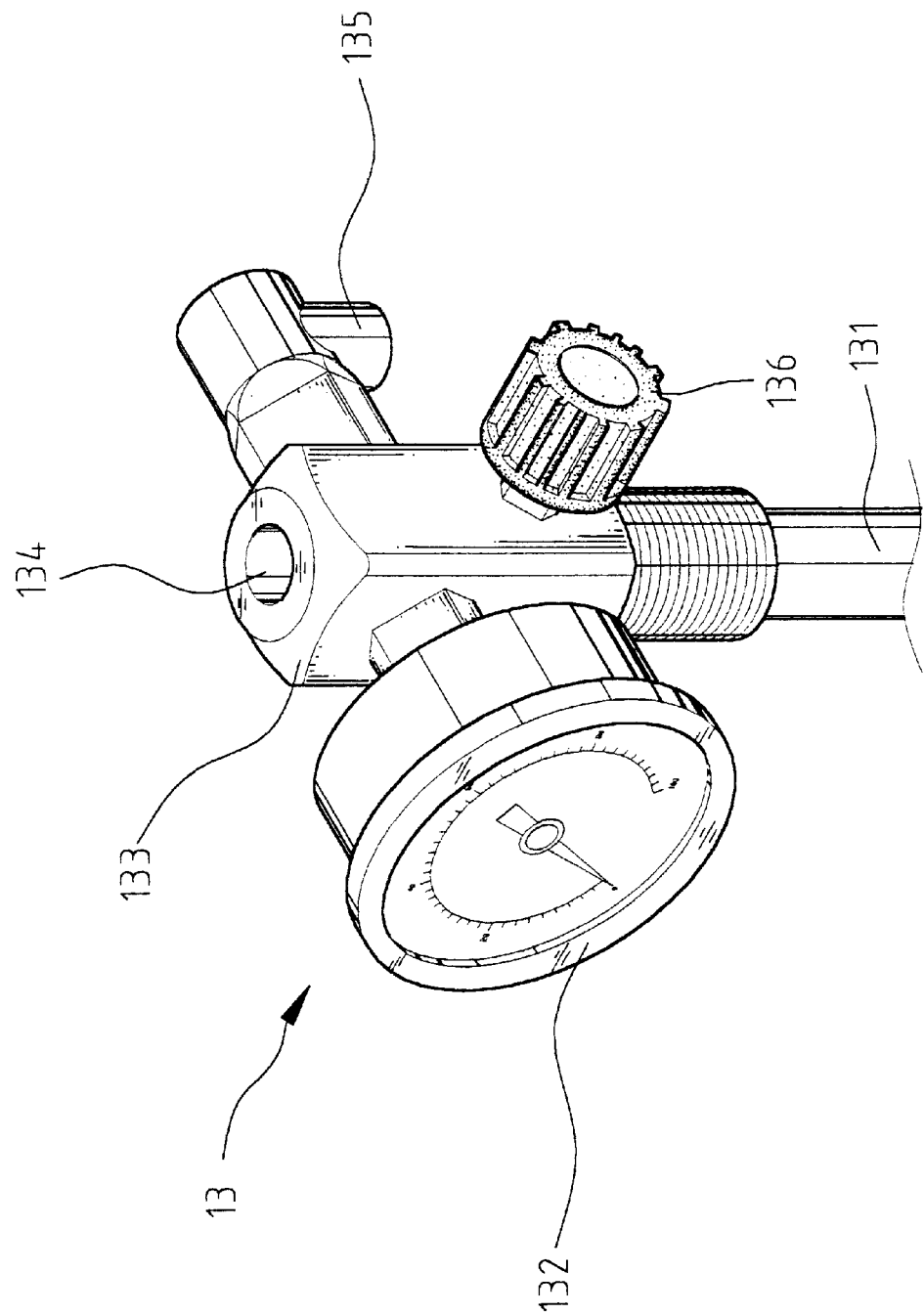
FIG. 3 is a perspective view of a switch device of the pneumatic/hydraulic balance weight system in accordance with the present invention.
Figure 4:
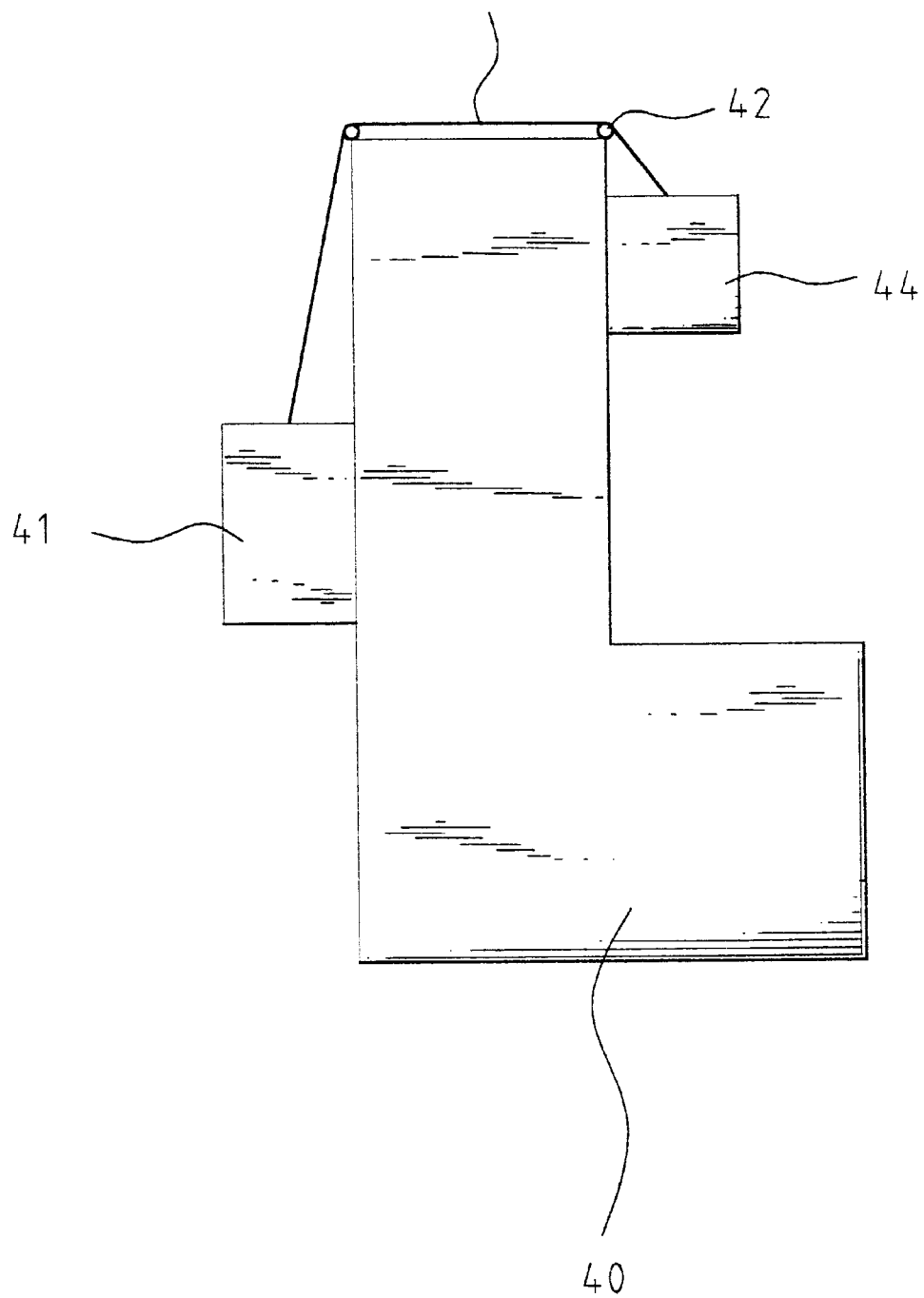
FIG. 4 is a schematic side view of a prior art balance weight system for mother machines.
Figure 5:
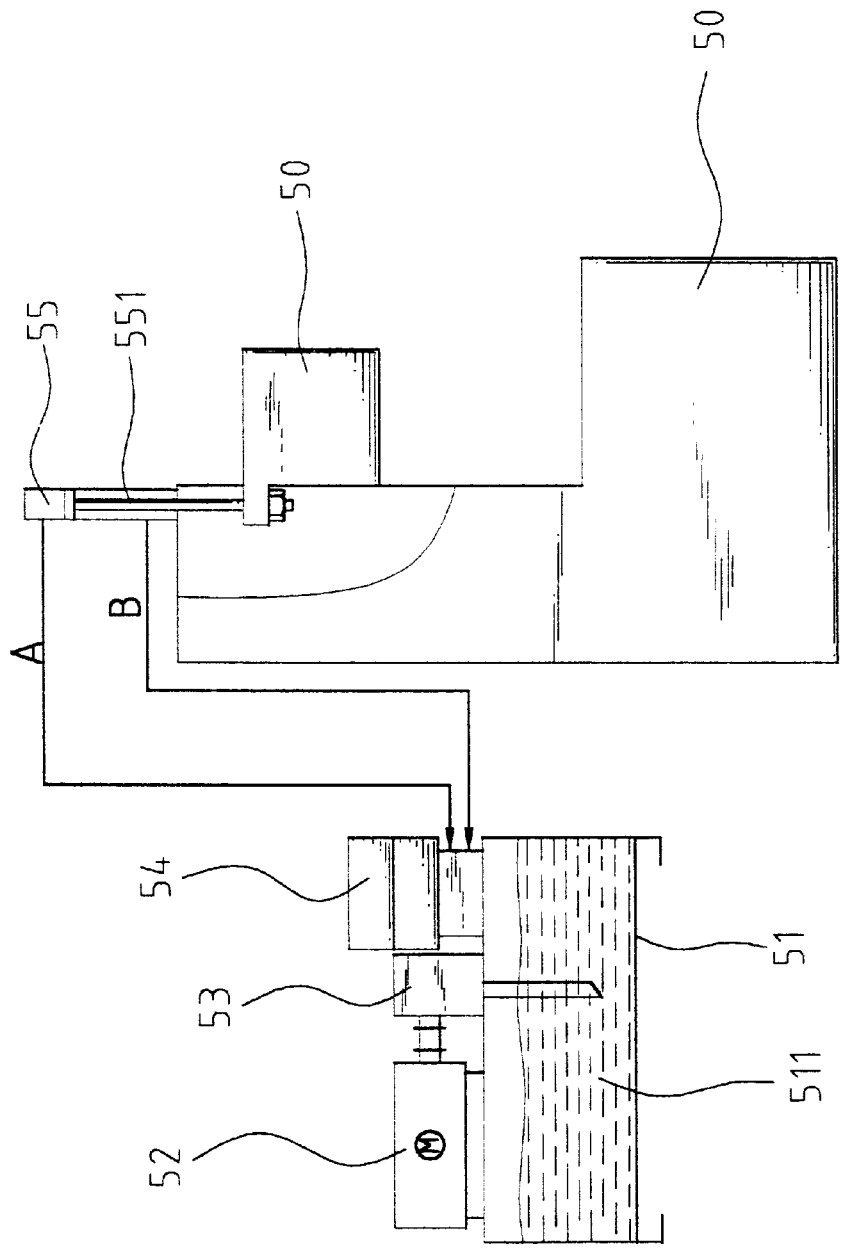
FIG. 5 is a schematic side view of another prior art balance weight system for mother machines.

Referring to FIGS. 1 to 3 and initially to FIG. 1, a pneumatic/hydraulic balance weight system for mother machines in accordance with the present invention generally includes a tank 12 containing hydraulic oil 30 and a working gas (e.g., nitrogen 20) therein. The tank 20 is made of seamless steel tube and secured by a nut 121. A steel tube 131 is mounted inside the tank 12 and includes a lower end in the hydraulic oil 30 and an upper end extending beyond the tank 12 and communicated to an end of a high pressure oil tube 14. The other end of the high-pressure oil tube 14 is connected to a cylinder 16, which will be described later. A control switch device 13 is mounted between the steel tube 131 and the high-pressure oil tube 14 for controlling the flux of the hydraulic oil 30.

A piston rod 166 includes a first threaded end 163 secured to a processing unit 11 of a mother machine 10 by nuts 164. The piston rod 166 further includes a second end with a piston head 161 which is slidably received in the cylinder 16 and separates the cylinder 166 into a lower chamber 168 and an upper chamber 167. Hydraulic oil 30 may flow into the lower chamber 168 via the tubes 30 and 14 from the tank 12 or vice versa Air is contained in the upper chamber 167 and communicated with environment via an outlet (not labeled) to which a muffler 162 is mounted to eliminate noise. A safety device 15 is mounted between the oil tube 14 and the cylinder 16 and includes a safety valve 151 and a needle valve 152, which will be described later.

Referring to FIG. 3, the control switch device 13 includes a pressure gauge 132, a pressure switch 135, a pressure release needle valve 136, a gas filler 133, and an oil filler 134. The pressure switch 135 controls the pressure of the hydraulic oil 30, and a pressure thereof can be read from the pressure gauge 132. An upper end of the oil filler 134 is connected to the high pressure oil tube 14, while a lower end of the oil filler 134 is connected to the steel tube 131.

In assembly, liquefied nitrogen is filled into the tank 20 via the gas filler 133 and then becomes gaseous nitrogen and thus expands in the upper part of the tank 20. The pressure of the gaseous nitrogen exerts a pressure on the hydraulic oil 30, which is then transmitted to the hydraulic oil in the lower chamber 168 of the cylinder 16 to supply the piston rod 166 with a force sufficient to uphold the processing unit 11. Then, a motor 17 is activated to drive the processing unit 11 upwardly (e.g., for lifting the processing unit 11 from a position shown in FIG. 2 to a position shown in FIG. 1) or downwardly under the guidance of a screw rod 18 which extends through an end of the processing unit 11. It is appreciated that the air in the upper chamber 167 of the cylinder 16 exits the cylinder 16 via the outlet and the muffler 162 for reducing the noise. It is appreciated that the force "F" (F=P * A, where "F" is the force, "P" is the pressure of the nitrogen, and "A" is the sectional area of the cylinder 16) initially supplied by the piston rod 166 (i.e., the moment the liquefied nitrogen completely becomes gaseous nitrogen) is approximately 1.05 times of the weight of the processing unit 11 so as to reliably support the processing unit 11. Then, the force is lowered (by releasing a portion of the gaseous nitrogen) to a level substantially the same as the weight of the processing unit 11 to uphold the processing unit 11 for subsequent upward/downward movement control of the processing unit 11 by the motor 17. Thus, the motor 17 (preferably a servomotor) may rapidly move the processing unit 11. It is appreciated that the safety valve 151 and the needle valve 152 further assure upholding of the processing unit 11 (i.e., the processing unit 11 will not move downwardly unless it is moved by the motor 17). In an embodiment of the invention, the tank 20 has a volume of 13 liters, wherein the gaseous nitrogen occupies approximately 9 liters, and the volume change of the gaseous nitrogen is about 0.4 liters, which will not cause a significant change in the pressure of the gaseous nitrogen, i.e., the pressure of the gaseous nitrogen may be deemed as a constant. Namely, the piston rod 166 is always supplied with a force "F" sufficient to uphold the processing unit 11. Although the embodiment illustrated is a balance weight system for a processing unit of a mother machine, it is appreciated that the balance weight system of the present invention may be used in other machines to uphold heavy objects.

According to the above description, it is appreciated that the force applied by the nitrogen to allow rapid movement control of the processing unit can reliably uphold the processing unit of the mother machine. In addition, the leakage and noise problems in the prior art are prevented. Further, the structure of the pneumatic/hydraulic balance weight system of the present invention is simple and occupies a relatively small space, and the maintenance thereof can be easily achieved. Further, the nitrogen used is not active and thus consumes a small amount of electricity. And the cost in the elements and maintenance as well as operation is relatively low.

Although the invention has been explained in relation to its preferred embodiment, it is to be understood that many other possible modifications and variations can be made without departing from the spirit and scope of the invention as hereinafter claimed.

What is claimed is:

1. A balance weight system for a unit, comprising:
    a cylinder,
    a piston rod having a first end adapted to be secured to the unit to move therewith, the piston rod further including a second end with a piston head slidably received in the cylinder and separating the cylinder into a lower chamber for containing hydraulic oil and an upper chamber for containing air,
    a tank including hydraulic oil contained in a lower part thereof and a working gas contained in an upper part thereof,
    a tube having a first end in the hydraulic oil in the lower part of the tank and a second end communicated with the lower chamber of the cylinder, the working gas exerting a pressure on the hydraulic oil to supply the piston rod with a force sufficient to uphold the unit, and
    means for moving the unit in a vertical direction.

2. The balance weight system according to claim 1, wherein the moving means including a vertical screw rod which extends through the processing unit and a motor for driving the vertical screw rod.

3. The balance weight system according to claim 2, wherein the motor is a servomotor.

4. The balance weight system according to claim 1, wherein the working gas is nitrogen.

5. The balance weight system according to claim 1, further comprising a control switch device mounted to the tube, the control switch device including a gas filler for filling the working gas into the tank.

6. The balance weight system according to claim 5, wherein the working gas is nitrogen and is filled into the tank via the gas filler under a liquefied status.

7. The balance weight system according to claim 5, wherein the control switch device further includes a pressure gauge to indicate the pressure of the working gas in the tank.

8. The balance weight system according to claim 5, wherein the control switch system further includes a release valve to release the working gas.

9. The balance weight system according to claim 1, further comprising a safety device including a safety valve and a needle valve for preventing downward movement of the processing unit without operation of the moving means.

10. The balance weight system according to claim 1, wherein the upper chamber includes an outlet communicated with environment.

11. The balance weight system according to claim 10, further including a muffler mounted to the outlet.

* * * * *